| United States Patent [19] | [11] 4,111,185 |
|---|---|
| Swann | [45] Sep. 5, 1978 |

[54] SOLAR HEATING SYSTEM

[76] Inventor: Frederick R. Swann, 5913 N. Bend Rd., Ashtabula, Ohio 44004

[21] Appl. No.: 671,282

[22] Filed: Mar. 29, 1976

[51] Int. Cl.² ............................................. F24J 3/02
[52] U.S. Cl. ................................... 126/271; 237/1 A; 126/400
[58] Field of Search .................... 126/271, 270, 400; 237/1 A

[56] References Cited

U.S. PATENT DOCUMENTS

| 2,484,127 | 10/1949 | Stelzer | 126/270 X |
| 2,677,367 | 5/1954 | Telkes | 126/400 |
| 2,907,318 | 10/1959 | Awot | 126/271 |
| 3,060,870 | 10/1962 | Hexdall | 126/400 X |
| 3,250,269 | 5/1966 | Sherock | 237/1 A X |
| 3,464,486 | 9/1969 | Rice et al. | 126/400 X |
| 3,902,474 | 9/1975 | Pyle | 126/271 X |

OTHER PUBLICATIONS

"Solar Energy is here, but it is not yet Utopia", by Edmund Faltermayer, Fortune Magazine, Feb., 1976, pp. 109, 110.

*Primary Examiner*—William F. O'Dea
*Assistant Examiner*—Larry Jones

[57] ABSTRACT

Disclosed herein is a heat exchange unit which includes a multiplicity of liquid containers, a supporting structure therefor. Enclosure is provided around the containers with duct means to introduce and withdraw air. Also disclosed is a solar panel structure for collecting solar energy which includes both air ducts and water ducts to extract heat.

7 Claims, 6 Drawing Figures

U.S. Patent  Sept. 5, 1978  Sheet 1 of 2  4,111,185
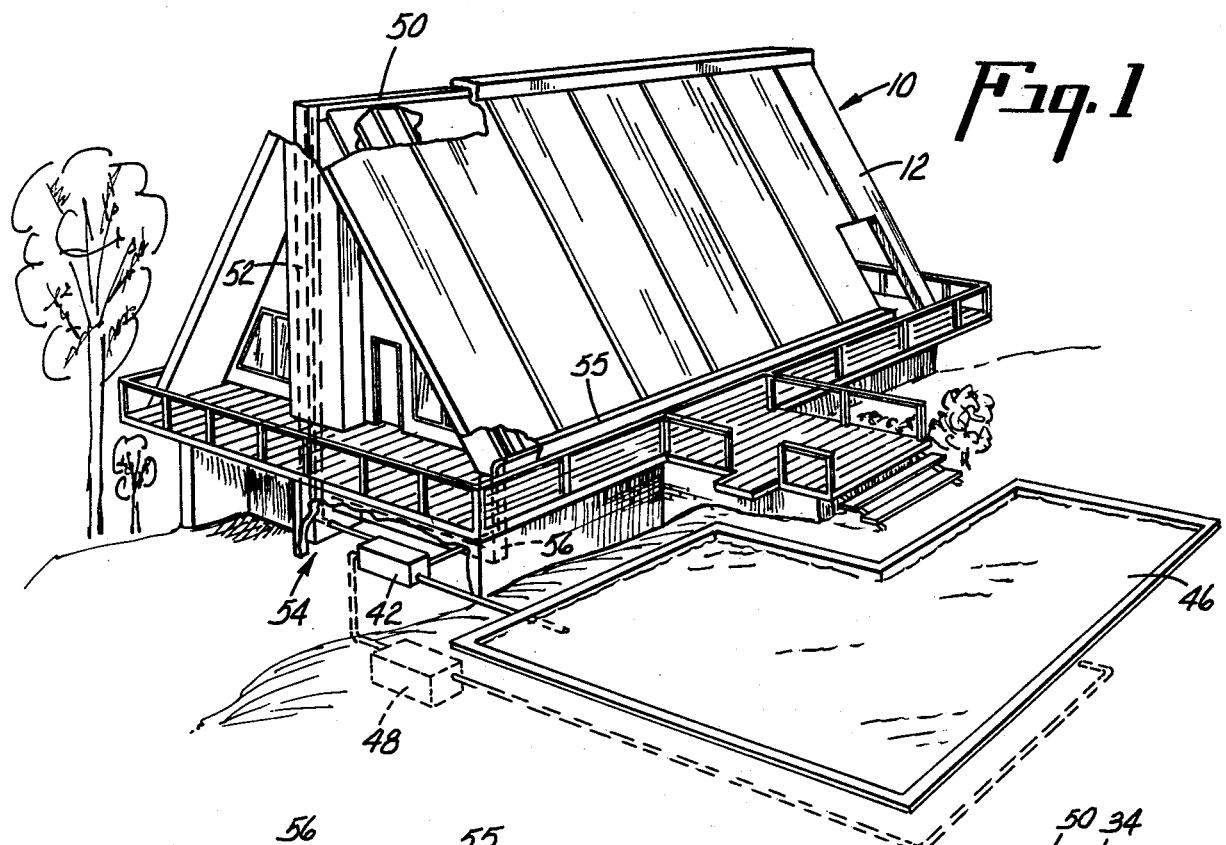
Fig.1
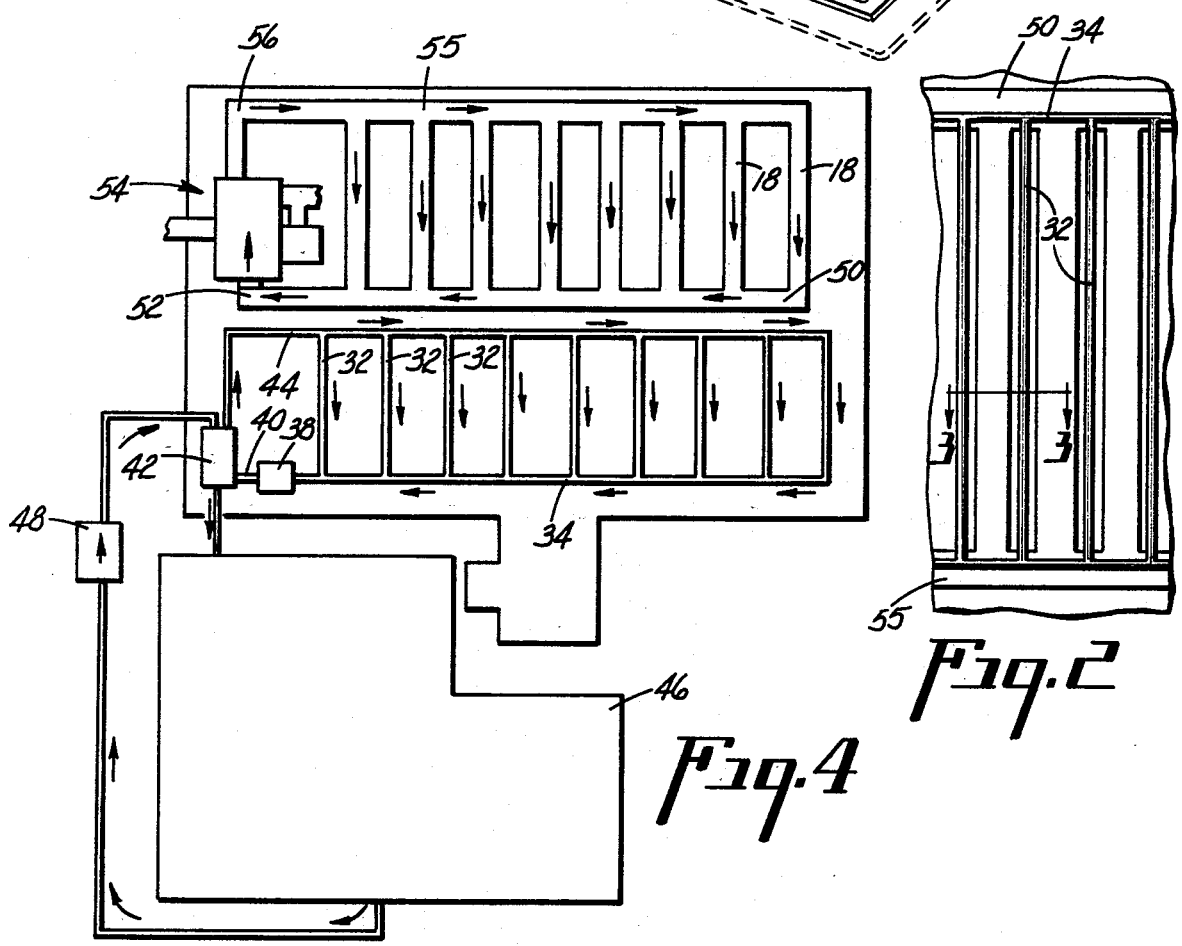
Fig.4
Fig.2

SOLAR HEATING SYSTEM

BACKGROUND OF THE INVENTION

This invention relates generally to solar heating and cooling systems, and more particularly this invention is concerned with the aspects of collecting solar energy and storing that collected energy.

There have been many, many prior art proposals for collecting and storing solar energy. The previous devices have relied on circulating a single type of fluid through a panel for collecting solar energy, and utilizing that fluid for heat exchange purposes. Normally this has been done with large heat sinks. The prior art devices have relied on large storage tanks of water or heated rocks or a combination of water and rocks for storing the energy. The use of a large tank for storing water or the use of heated rocks has posed many problems of containing liquids, and heat exchange problems, and storage and location problems. Also, repairs are difficult and bulk storage is required making this type of heat exchange media very undesirable.

It is therefore a principal object of this invention to provide an improved heat storage and exchange medium for solar heating and also to provide improved solar panel for collecting solar energy.

SUMMARY OF THE INVENTION

According to the present invention an improved storage system for heating and cooling a structure utilizing solar energy is provided wherein solar panels are provided which have means for heating flowing air. The heat exchange unit for exchanging heat from the flowing air includes a multiplicity of containers, each containing a liquid, and support means are disposed to support the filled containers in a closely spaced array. Enclosure means surround the supported units define air passage means for allowing air to flow past and in contact with the containers and duct means are provided to communicate with the enclosure means to allow for inflow and outflow of air to and from the enclosure. The present invention also contemplates a solar panel assembly which comprises panel means for collecting heat from the sun, air duct means formed in heat transfer relationship with the panel means, means to flow air through the air duct means, heat storage and transfer means connected to the duct means, liquid conduit means in the heat transfer relationship with the panel means, means to flow liquid through said conduit means, and heat transfer means connected to the liquid conduit means whereby the air transfer system or the liquid heat transfer system can be used separately or concomitantly.

DESCRIPTION OF THE DRAWING

FIG. 1 is a perspective view somewhat diagramatic showing an improved solar energy collection means incorporated on the roof of a dwelling, an indication of how the means can be utilized to heat a swimming pool;

FIG. 2 is a detailed plan view on a larger scale of a portion of the heating and cooling means on the roof of a house showing the duct means and conduit means;

FIG. 4 is a somewhat schematic view of the flow diagram of the air and water of the solar energy collection;

DESCRIPTION OF THE PREFERRED EMBODIMENT

Figure 3:
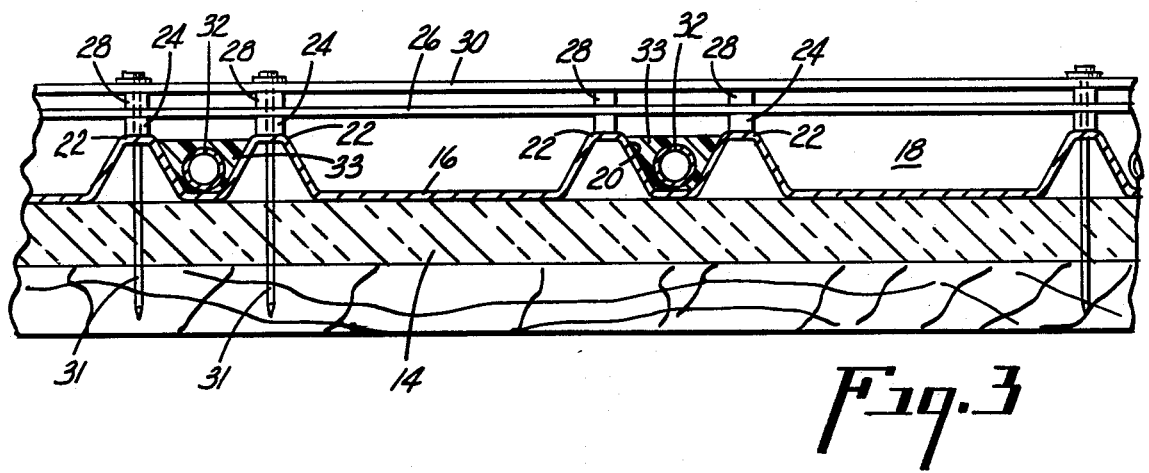
FIG. 3 is a sectional view taken substantially along the plane designated by the line 3—3, FIG. 2.

Referring now to the drawing and for the present FIGS. 1–4, an improved solar energy collecting device according to this invention is shown. FIG. 1 shows schematically a typical dwelling house designated generally as 10, having secured thereto a collecting device 12 according to this invention. The device includes a layer of insulation 14 disposed over the entire surface of the roof. Layed on top of the insulation 14 there is corrugated panel 16. The panel 16, formed of a number of members, is formed of a good heat collecting material such as, for example, aluminum, and preferably has an upper surface painted black which is a good heat absorbing color. The panel members 16 are corrugated in such a way as to provide relatively wide channels 18 and relatively narrow channels 20 which are defined by raised ribs 22. Extending along the raised ribs 22 are strips of insulating material 24, over which are laid plexiglass or other light transmitting sheets 26. These can be bonded to the strips 24, which strips in turn can be bonded to the tops of the channels 22. To further provide good insulation, a second set of strips of insulation 28 are bonded to the top of the plexiglass sheets 26, and bonded to the top thereof is a second layer of plexiglass sheets 30. Thus, there is a layer of air which is a good insulating material between the plexiglass sheets 26 and 30. In order to further secure the entire assembly to the roof, it can be nailed by nails 31, passing through the plexiglass strips 26 and 30, as well as through the strips of insulation 24 and 28, and through the insulation 14 into the top of the roof. As thus constructed, there is a roof having thereon a thick layer of insulation with solar energy collecting panels 16 on top of insulation, over which are laid a pair of plexiglass sheets 26 and 30 to provide a solar energy collecting source. The panels 16 act as excellent collectors of solar energy.

In order to utilize the collected energy, fluid heat transfer means are provided. These fluid heat transfer means in this improved solar panel take the form of both gas and liquid media which can be used either independently or concomitantly. To this end liquid conducting pipes 32 are disposed in the small channels 20 and are secured therein, preferably by some type of heat conducting cement 33 such as for example, the type sold under the trademark Thermobond. The liquid pipes 32 provide a channel for the flowing of liquid. Larger channels 18 provide channels for the flow of air.

The liquid pipes 32 are connected to a header pipe 34 at the top of the roof on each side thereof, which header pipe is connected to a fluid circulating pump 38. The pump 38 in turn is connected through pipe 40 to a heat exchanger 42, through which the fluid is pumped into a header pipe 44, which in turn is connected to the liquid pipes 32. Thus there is a closed loop flow system circulating by means of the circulating pump 38 through the two header pipes 34 and 44, and the liquid carrying pipes 32, which are in a heat conducting relationship with the panel 16 to thereby extract heat from this panel and deliver it to the heat exchange.

The heat exchanger 42 is shown in communication with a swimming pool 46 in which the water is continuously circulated by means of a pool pump and filter 48 through the heat exchanger 42. Thus the water is pumped from the pool 46 through the heat exchanger 42, and the heated water from the roof panels is utilized to heat the swimming pool. It is to be understood that this is merely an illustration to show how this water can be used in a heat exchanger, it being understood that it could equally well be used for heating water in a hot water tank or wherever else heating is needed.

The roof heating panels also are provided with an insulated header duct 50, which runs along the top thereof, which also endorses the header pipe 34. The duct 50 communicates with the large channels 18 on both sides thereof, which header duct in turn extends down to an insulated downflow duct 52, into the improved heat storage and exchange device of the present invention designated as 54. A return duct 56 extends from the heat exchange storage 54 to bottom channel 55 on the roof to allow return flow air to be re-introduced to the lower ends of the channels 18.

Figure 5:
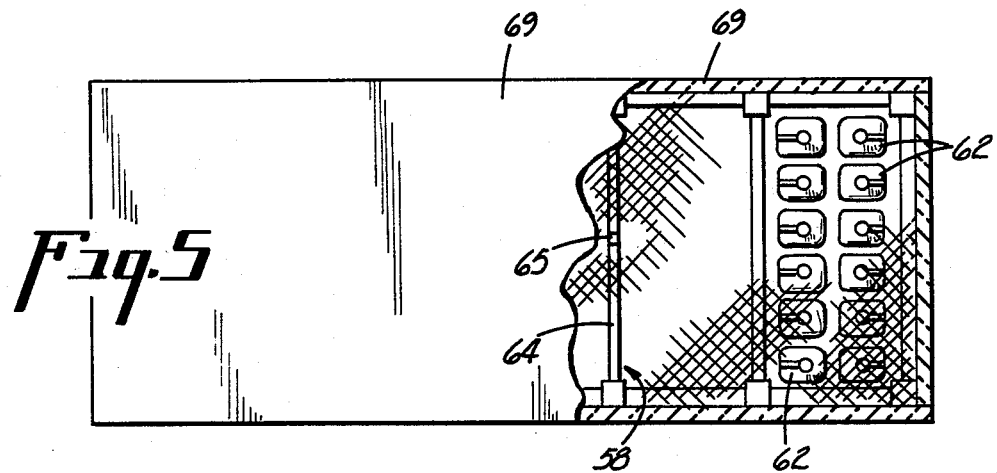
FIG. 5 is a plan view partially in section, showing the improved heat exchange unit of the present invention.
Figure 6:
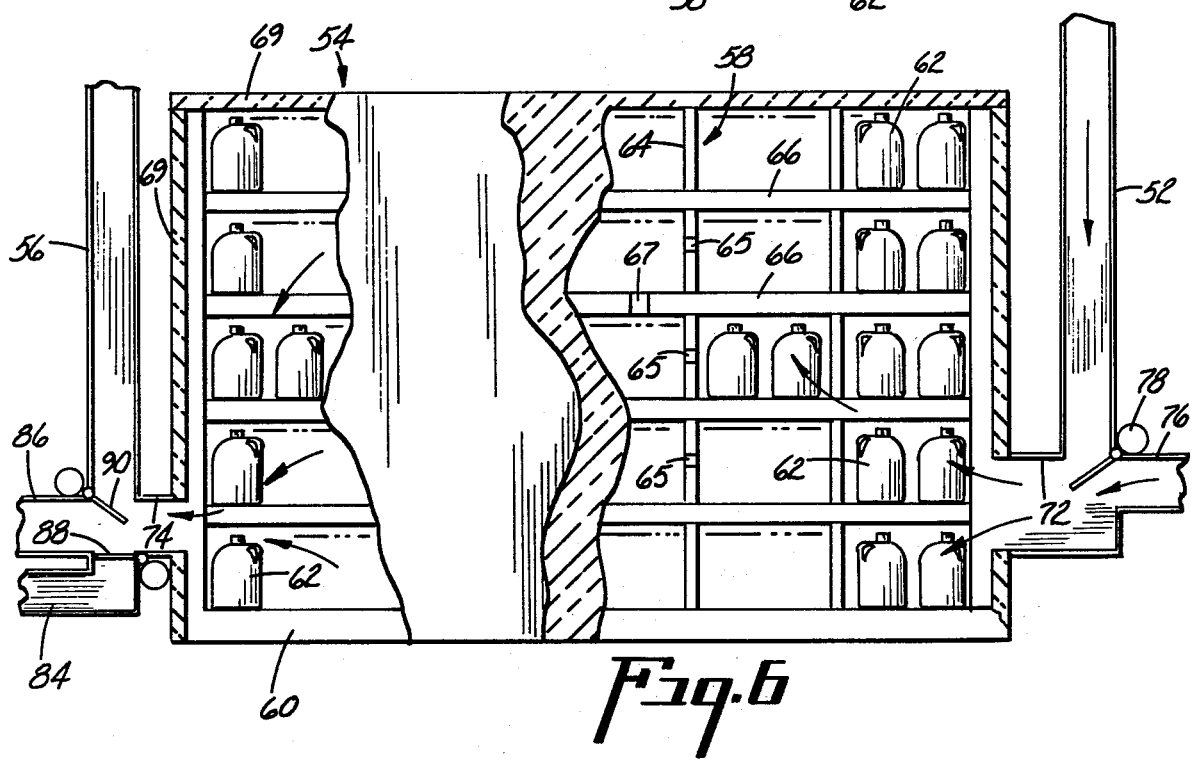
FIG. 6 is a side elevational view partially in section showing the device of FIG. 5.

The improved heat storage and exchanger 54 of this invention is shown in detail in FIGS. 5 and 6, to which reference is now made. This device includes a rack or frame 58 supported on a floor or base 60. The rack or frame 58 is constructed of sufficiently sturdy materials to support thereon an array of individual liquid containers 62, preferably the one gallon size, each of which may be conventional plastic liquid containers. These containers are shown spaced in arrays or groups of twelve on each shelf 66 of the rack, separated by partitions 64 which have openings 65 therethrough. The shelves 66 also are provided with openings or aperatures 67. Thus the entire rack structure is secured to provide air flow therethrough; and when the containers 62 are closely arrayed as shown in FIGS. 5 and 6, any flow of air therethrough will flow over, around, and in contact with the contains through the entire rack structure. Thus the liquid containers 62, which preferably have caps 68 to prevent evaporation of the fluid, act as a large heat sink to extract heat from the flowing air as it is introduced thereto, and store the heat in liquid. The rack structure 58 is enclosed on all sides by means of insulating panels 69 to prevent heat loss and provide the necessary insulation the panels being secured thereto. However, it is preferable that at least one of the panels, preferably one of the side panels and even more preferably both of the side panels, be mounted for easy removal to allow for accessibility, to the interior of the rack structure 58.

A heat storage device 54 constructed according to this invention has as one of its great advantages a very large amount of liquid contained therein to provide an effective heat sink; but the liquid is stored in individually manageable containers so that a very large, exceedingly strong separate liquid container need not be maintained. Rather the liquid is stored in individual containers, each of which can be easily procured and utilized, and which can be replaced independently in case of any damage or leakage to the individual containers. Also, the amount and volume of liquid can be readily changed with the required needs. Further, the size and shape of the device can be very easily changed or modified to conform to the requirements wherever the device is to be located within the home structure. For example, it can be made tall and narrow so as to fit against a wall or in a corner, or it can be made short and extended if it is to fit underneath the floorboards or in a crawlspace. In other words, the shape of the container can literally be developed in every installation to conform to the place to which it is to be installed, the shape can be very easily attained by providing individually assemblable shalfs and panels with the desired configuration. Also, the individual containers allow easy air flow around the containers.

To complete the structure, the device is provided with an air intake duct 72 at one end thereof and air discharge duct 74 at the opposite end thereof. Attached to the air intake duct is the downflow duct 52 from the solar heating device on the roof. Shown schematically are various connecting ducts, such as the duct 76 which is a return air duct from the dwelling house. Also damper is shown schematically at 78, together with associated controls therefor. This will regulate the flow of air into the heat exchanger, and depending on whether it is being utilized at the time, to collect heat from the roof or to give up heat to the circulated air to heat the house. In any event, it is to be understood that these are merely schematic showings and that no claim, per se, to a specific control system is made, it being understood that those skilled in the art will readily recognize the various modes of controlling the inflow and outflow of the air for extracting and giving up heat as required. Similarly, the air discharge duct 74 is connected to the return duct 56 which will return the air to the heating panels on the roof, exhaust duct 84, and a house heating duct 86 which is regulated by dampers 88 and 90 with associated controls. Again it is to be understood that these controls and dampers are a part of the overall control system which may vary for the particular needs, and no claim, per se, is being made to the control system.

As can be seen from the foregoing, an improved panel is provided on the roof which will heat either air or water or both. These can be used wither individually or concomittantly for extracting heat from solar energy and utilizing it in heat exchange relationship for various purposes. Also can be seen that an improved heat storage and heat exchange device is provided wherein an array of individual liquid containers are provided with rack supporting means which can be utilized to store and give up heat as required.

What is claimed is:

1. An improved solar heating panel assembly comprising solid panel means for collecting heat from the sun, air duct means formed in heat transfer relationship with said panel means, said panel means forming a part of said air duct means, means to permit air flow through said air duct means, liquid conduit means in conductive heat transfer relationship with said panel means and surrounded at least in part by said air duct means, and means to flow liquid through said conduit means, and closed loop heat transfer means connected to said liquid conduit means, whereby either the air heat transfer system or the liquid heat transfer system can be utilized separately or concomitantly.

2. In a system for heating and cooling a structure utilizing solar energy, and wherein solar panels are provided which have means for heating flowing air, the improvement comprising, a heat exchange unit for exchanging heat with flowing air, said heat exchange unit including a multiplicity of containers each containing a liquid adapted to act as a heat sink, support means including shelf means disposed to support said filled containers in a closely spaced array with each container separated from each adjacent container, enclosure means surrounding enclosing said supported containers and defining air passage means for allowing air to flow past and in contact with said filled spaced containers in heat transfer relationship with all of each of said containers, access means through the enclosure means to provide access to each container individually for individual replacement thereof first and second duct means disposed to communicate with said enclosure means to allow for inflow and outflow of air to and from the enclosure means, fan means to circulate air through the duct means, and control means to regulate the source and disposition of incoming and outflowing air, including means connected to the solar panels to receive air therefrom and means connected to the structure to direct air thereto.

3. The invention as defined in claim 2 wherein said rack and shelf structure includes aperature means to promote air flow.

4. The invention as defined in claim 2 wherein said rack and shelf structure includes means for sectional assembly thereof for selection of configuration.

5. The invention as defined in claim 2 further characterized by said container having removable closure means to provide for filling thereof.

6. The invention as defined in claim 2 further characterized by insulating means enclosing said containers and including means to provide access thereto.

7. The invention as defined in claim 1 further characterized by said solar panels having solid panel means for collecting heat from the sun, air duct means formed in heat transfer relationship with said panel means and formed at least in part by said panel means to permit air flow through said air duct means, liquid conduit means in heat transfer relationship with said panel means and surrounded at least in part by said air duct means, and means to flow liquid through said conduit means, and closed loop heat transfer means connected to said liquid conduit means, whereby either the air heat transfer system or the liquid heat transfer system can be utilized separately or concomitantly.

* * * * *